United States Patent [19]

Sato et al.

[11] Patent Number: 5,206,779
[45] Date of Patent: Apr. 27, 1993

[54] NOISE FILTER WITH SURGE ABSORBER AND SURGE ABSORBER ATTACHED TO NOISE FILTER

[75] Inventors: Sadahiro Sato, Okaya; Yoshihito Oguchi; Akihiko Ikazaki, both of Tokyo, all of Japan

[73] Assignee: Okaya Electric Industries Co., Ltd., Tokyo, Japan

[21] Appl. No.: 720,952

[22] Filed: Jun. 25, 1991

[30] Foreign Application Priority Data

Oct. 1, 1990 [JP] Japan .................... 2-103421[U]
Nov. 15, 1990 [JP] Japan .................... 2-119979[U]
Nov. 15, 1990 [JP] Japan .................... 2-119980[U]

[51] Int. Cl.$^5$ ...................... H02H 3/22; H01R 13/207
[52] U.S. Cl. ...................... 361/111; 439/801; 439/825
[58] Field of Search .............. 361/111, 58, 56, 119, 361/117; 439/825, 801

[56] References Cited

U.S. PATENT DOCUMENTS

| | | | |
|---|---|---|---|
| 2,939,095 | 5/1960 | Chertok | 361/56 |
| 4,259,705 | 3/1981 | Stifter | 361/56 |
| 4,384,758 | 5/1983 | Lee et al. | 439/801 |
| 4,698,721 | 10/1987 | Warren | 361/111 |
| 4,794,485 | 12/1988 | Bennett | 361/56 |
| 4,807,083 | 2/1989 | Austin | 361/111 |

Primary Examiner—A. D. Pellinen
Assistant Examiner—Ronald W. Leja
Attorney, Agent, or Firm—Morrison Law Firm

[57] ABSTRACT

A combined noise filter and surge absorber for electrical and electronic equipment. The surge absorber may be removed for replacement, maintenance or testing without requiring the removal of the noise filter. Thus the equipment in which the noise filter is installed can continue to operate without the loss of noise filtering. The removability of the surge absorber from the noise filter allows flexibility in the installation of the surge absorber, enabling the invention to be adapted to a variety of equipment. A separate surge absorber can also be attached to equipment having an existing noise filter by means of various adapter embodiments of the present invention. These embodiments adapt the connecting terminals of the surge absorber to various types of external terminals of the noise filter.

4 Claims, 7 Drawing Sheets

NOISE FILTER WITH SURGE ABSORBER AND SURGE ABSORBER ATTACHED TO NOISE FILTER

BACKGROUND OF THE INVENTION

The present invention relates to a noise filter, and more particularly to a noise filter with a surge absorber, to be connected to a power supply line of electronic or electrical equipment. The noise filter includes a surge absorber for absorbing line surges, such as those induced by lightning. The noise filter prevents high frequency noise generated within the equipment from being transmitted to the input line voltage.

The present invention also relates to a separate surge absorber for absorbing line surges, such as those induced by lightning, to be attached to a noise filter.

Electromagnetic interference (EMI) is a serious problem in the operation of electronic and electrical equipment. Recently, regulations passed in a number of countries require the control of EMI emissions. For example, agencies including the CISPR of the European Economic Community, the FCC of the United States, VDE of Germany, and VCCI of Japan have each developed EMI standards. Each of these agencies is enforcing its respective EMI standards on electronic and electrical equipment. Many countries prohibit the import of equipment not meeting EMI standards. As a result, there have been inventions of numerous noise suppression parts and of means for reducing EMI interference. These inventions not only reduce EMI emissions, but also reduce the susceptibility of equipment to EMI.

Electronic and electrical equipment employ noise filters as one type of absorber. The noise filter is a low-pass filter; it damps voltage noise which exceeds a cutoff frequency while permitting voltage below the cutoff to pass through. This type of filter consists of coils and capacitors to damp high frequency noise of several tens of KHz to several hundreds of MHz. Different types of noise filters address a variety of application requirements, such as, for example, terminal type, voltage, phase, equipment sensitivity, etc.

Surge absorbers, on the other hand, protect electronic or electric circuits from a transient high voltage or high current induced on a power or signal line by, for example, a lightning strike. Surge absorbers may consist of any of a suitable combination of varistor (a voltage dependent nonlinear resistor), a gas arrester (an air discharge absorbent), a surge absorber element (a pair of electrodes connected to both ends of a varistor with a discharge distance stored in a airtight container), and other types of apparatus. The elements of a surge absorber depend on the application requirements.

Inventions combining a noise filter and surge absorber in a single device can damp high frequency noise and act as a surge absorber at the same time. The combined device has the advantage of compactness and low weight. However, manufacturers and distributors must produce and stock many different models; existing electronic and electrical equipment have a large range of specifications. That is, combined noise filters and surge absorbers cannot be standardized because of the great variety of sizes, shapes, and power requirements of the equipment they attach to. This increases the cost of manufacture and complicates inventory management.

An additional problem arises in testing the equipment. As part of the final manufacturing process, high voltage may be applied to equipment attached to a combined noise filter and surge absorber. This may damage the filter or absorber element, requiring the replacement of the complete device.

OBJECTS AND SUMMARY OF THE INVENTION

Therefore, it is an object of the present invention to provide a combined noise filter and surge absorber that overcomes the drawbacks of the prior art. It is a further object of the present invention to provide a combined noise filter and surge absorber which does not require manufacture and stocking of numerous models each having a different set of characteristics. It is still a further object of the present invention to overcome drawbacks of the prior art in testing equipment attached to combined noise filters and surge absorbers.

Briefly stated, there is provided a combined noise filter and surge absorber for electrical and electronic equipment. The surge absorber may be removed for replacement, maintenance or testing without requiring the removal of the noise filter. Thus the equipment in which the noise filter is installed can continue to operate without the loss of noise filtering. The removability of the surge absorber from the noise filter allows flexibility in the installation of the surge absorber, enabling the invention to be adapted to a variety of equipment. A separate surge absorber can also be attached to equipment having an existing noise filter by means of various adapter embodiments of the present invention. These embodiments adapt the connecting terminals of the surge absorber to various types of external terminals of the noise filter.

According to an embodiment of the present invention, there is provided apparatus comprising: a noise filter, the noise filter including input means and output means, the noise filter including filter means, between the input means and the output means, for filtering signals, a surge absorber, connecting means for removable connection of the surge absorber in parallel with the input means, and the connecting means including both mechanical connecting means and electrical connecting means.

According to a feature of the invention, there is provided apparatus comprising: a noise filter, attaching means affixed to the noise filter, at least first and second terminals passing through the attaching means and connecting to elements within the noise filter, a three terminal socket affixed to the attaching means, at least first and second terminals of the three terminals socket being electrically connection to the at least first and second terminals, a surge absorber, a three terminal plug on the surge absorber, the three terminals plug being removable material with the three terminal socket, and removable means for retaining the plug and the socket in a mated condition, whereby the surge absorber is enabled to work with the noise filter.

According to a further feature of the invention, there is provided apparatus comprising: a noise filter, first, second and third threaded terminals extending from the noise filter, first, second and third connector means, each of the connector means having a first end including an internal screw thread threadable on a respective one of the threaded terminals, each of the connector means having a second end adapted to receive a banana terminal, a surge absorber, and the surge absorber including first, second and third banana terminals each mateable with a respective one of the second ends.

According to a still further feature of the invention, there is provided apparatus comprising: a noise filter, first, second and third threaded terminals extending from the noise filter, first, second and third connector means, each of the connector means having a first end including an internal screw thread threadable on a respective one of the threaded terminals, each of the connector means including a second end having a threaded shaft, a connecting means, first, second and third mounting holes passing through the connecting means, each of the threaded shaft being alignable with and passable through a respective one of the mounting holes, and being long enough to extend its end beyond the connecting means, a plurality of nuts threadable on the ends and tightenable to secure the connecting means to the noise filter, a three terminal socket on the connecting means, a surge absorber, a three terminal plug on the surge absorber mateable with the three terminal socket, and means for removably securing the three terminal socket, whereby the surge absorber may be connected for use with a standard noise filter.

The above and other objects, features and advantages of the invention will become apparent from the following description of the preferred embodiment read in conjunction with the accompanying drawings, in which like reference numerals designate the same elements.

DETAILED DESCRIPTION OF THE PREFERRED EMBODIMENTS

Figure 1:
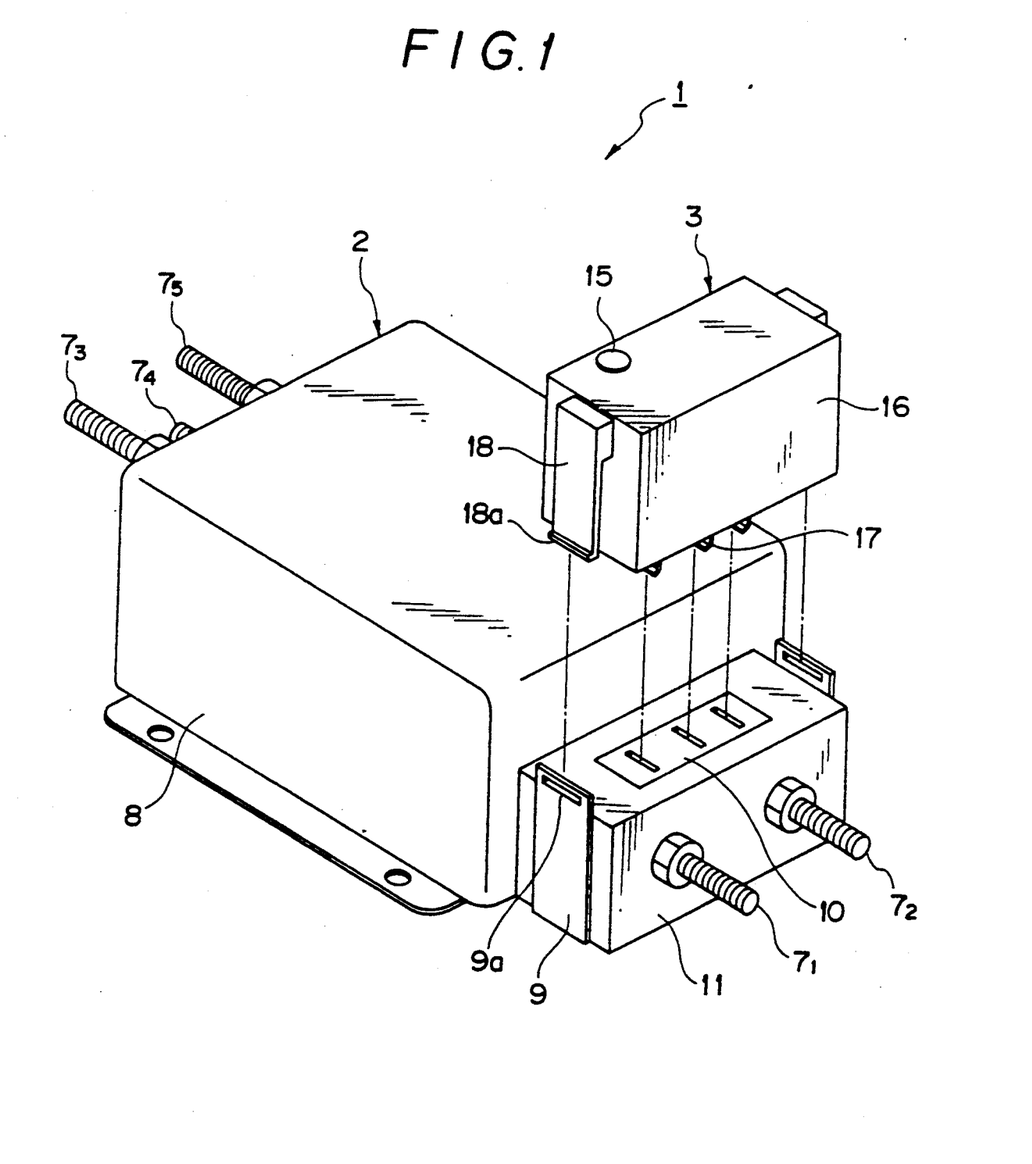
FIG. 1 is a perspective view of a preferred embodiment of the present invention.

FIG. 1 is a noise filter with surge absorber 1 comprising a surge absorber 3 that is removably attached to attaching means 11 of a noise filter 2. Surge absorber 3 is stored in a plastic case 16 having an indicator lamp 15 mounted on a top side. On the bottom side of case 16 is located a three pronged plug 17 that removably connects to a three terminal socket 10 which is mounted on a top side of attaching means 11 of noise filter 2. Attaching means 11 extends from an end of a metal chassis 8, which encloses noise filter 2. An attaching piece 18 with an extended convex tab 18a is insertable in a hole 9a on a connecter plate 9 to secure surge absorber 3 to noise filter 2. Extending from a front side of attaching means 11 are external terminals $7_1$ and $7_2$. As seen in the figure, external terminals $7_3$, $7_4$, and $7_5$ extend from a rear side of metal chassis 8.

Figure 2:
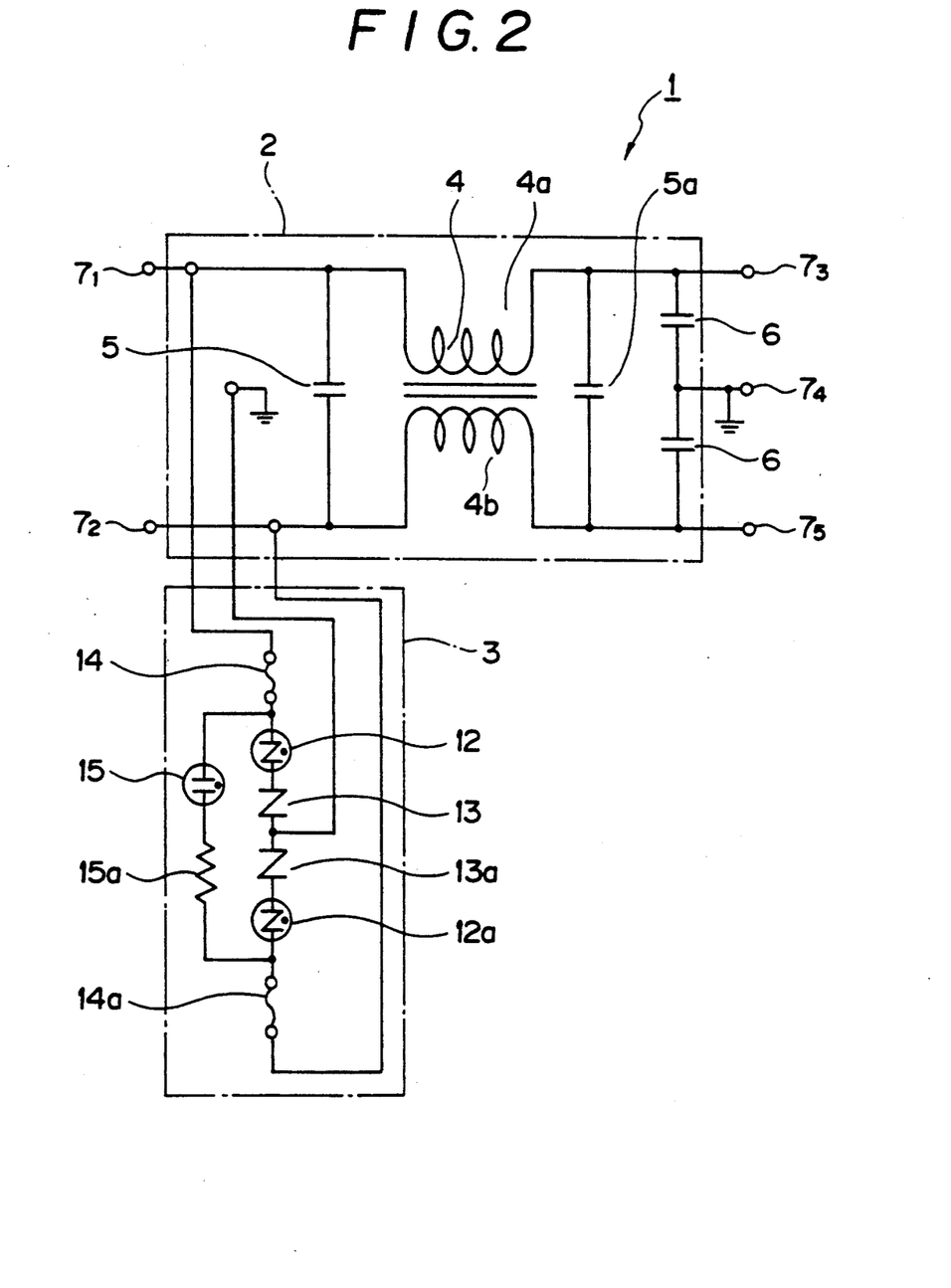
FIG. 2 is a circuit diagram of the present invention of a combined noise filter and surge absorber of FIG. 1.

Referring to FIG. 2, external terminal $7_1$ connects to a junction of a first end of a capacitor 5, a first end of a winding 4a of a coil 4 and a first end of a fuse 14 of surge arrestor 3. A second end of capacitor 5 is connected to a junction of external terminal $7_2$, a first end of a winding 4b of coil 4 and a first end of a fuse 14a of surge absorber 3.

A first end of a capacitor 5a connects to a junction of a second end of winding 4a of coil 4, a first end of a capacitor 6 and external terminal $7_3$. A second end of capacitor 5a connects to a junction of a second end of winding 4b of coil 4, a first end of a capacitor 6a, and external terminal $7_5$. Second ends of capacitors 6 and 6a connect to ground.

A second end of fuse 14 of surge arrester 3 connects to a junction of a first end of a surge absorbing element 12 and a first end of indicator lamp 15 connects to a first end of a resistor 15a which in turn connects to a junction of a second end of fuse 14a and a first end of a surge absorbing element 12a. Second ends of surge absorbing elements 12 and 12a connect to first ends of varistors 13 and 13a respectively, and second ends of varistors 13 and 13a are connected to ground.

Each of surge absorbing elements 12 and 12a consists of a varistor, which may be, for example, a nonlinear voltage-dependent resistor having an electrode and a discharge distance at each end, with the entire element housed in an air proof container. As shown in the figure, surge absorber 3 contains of two series strings. The first of these strings, fuse 14, surge absorbing element 12, and varistor 13, is connected between external terminal $7_1$ and ground. When the input line voltage across external terminal $7_1$ and ground exceeds a preselected value as the result of a power surge, the resistance of surge absorbing element 12 and varistor 13 reduces, to effectively ground the overcurrent. Surge absorbing element 12 reacts to control relatively short term surges, while varistor 13 controls longer term overvoltage surges. Fuse 14 protects surge absorber 3 from further damage, in the event that surge absorbing element 12 or varistor 13 are shorted.

The series string comprising fuse 14a, surge absorbing element 12a and varistor 13a is connected between external terminal $7_2$ and ground. This series string performs the same function as the first string.

Indicator lamp 15 lights when power is applied to terminals $7_1$ and $7_2$. In the event either fuse 14 or 14a opens, indicator lamp 15 goes out. Resistor 15a is a dropping resistor to control the voltage to indicator lamp 15.

The components of noise filter 2, the interconnections of which is described previously, form a conventional low-pass filter. The operation of noise filter 2 is to block high-frequency noise from being transmitted from equipment to a line source, as well as to prevent line noise from being connected to the equipment.

Because surge absorber 3 is removably connected to noise filter 2, it can be attached to or removed from noise filter 2 as required. This also allows surge absorber 3 to be easily replaced in the event of failure, even with noise filter 2 installed in equipment.

Figure 3:
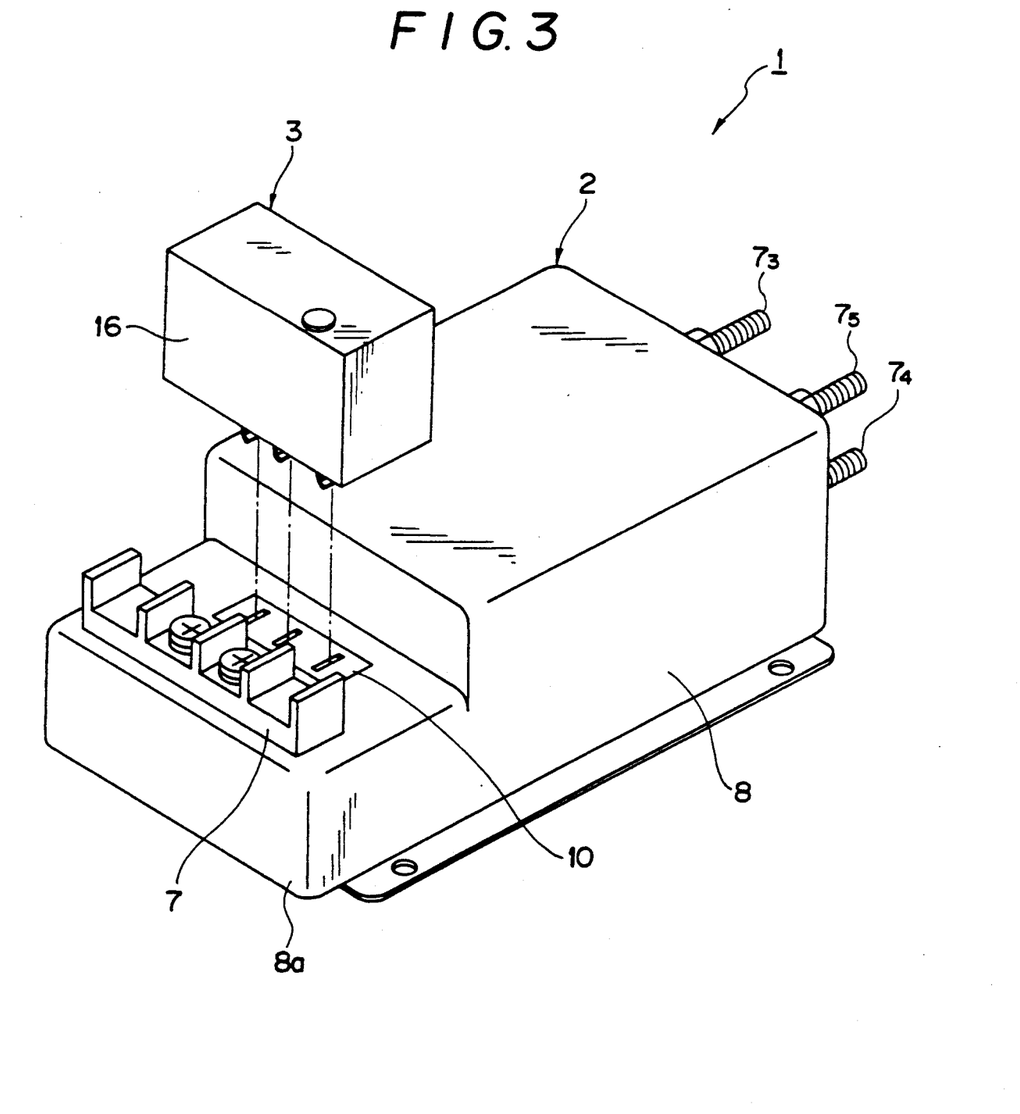
FIG. 3 is a perspective view of a second embodiment of the present invention.

Referring to FIG. 3, a second embodiment of a noise filter with surge absorber 1 comprises a noise filter 2 that is housed in a metal chassis 8, and a removable surge absorber 3. Surge absorber 3 is housed in a case 16. A three terminal socket 10 that is supported on a top surface of a rectangular projection 8a of metal chassis 8 removably accepts corresponding three pronged plug 17. Three terminal socket 10 and three pronged plug 17 connect surge absorber 3 to noise filter 2 electrically as well as physically. An external connector 7 is a two connection terminal strip located on the top surface of projection 8a, between three terminal socket 10 and a forward edge as seen in the figure. Three stud-type external terminals $7_3$, $7_4$, and $7_5$ extend from a rear side of metal chassis 8.

The placement of surge absorber 3 on noise filter 2 in this embodiment is not restricted to the location shown in the figure. By relocating three terminal socket 10 on metal chassis 8, surge absorber 3 can be set in any convenient position dictated by a special application.

The electrical circuit and its operation in this embodiment is identical to that of the embodiment of FIG. 1.

Figure 4:
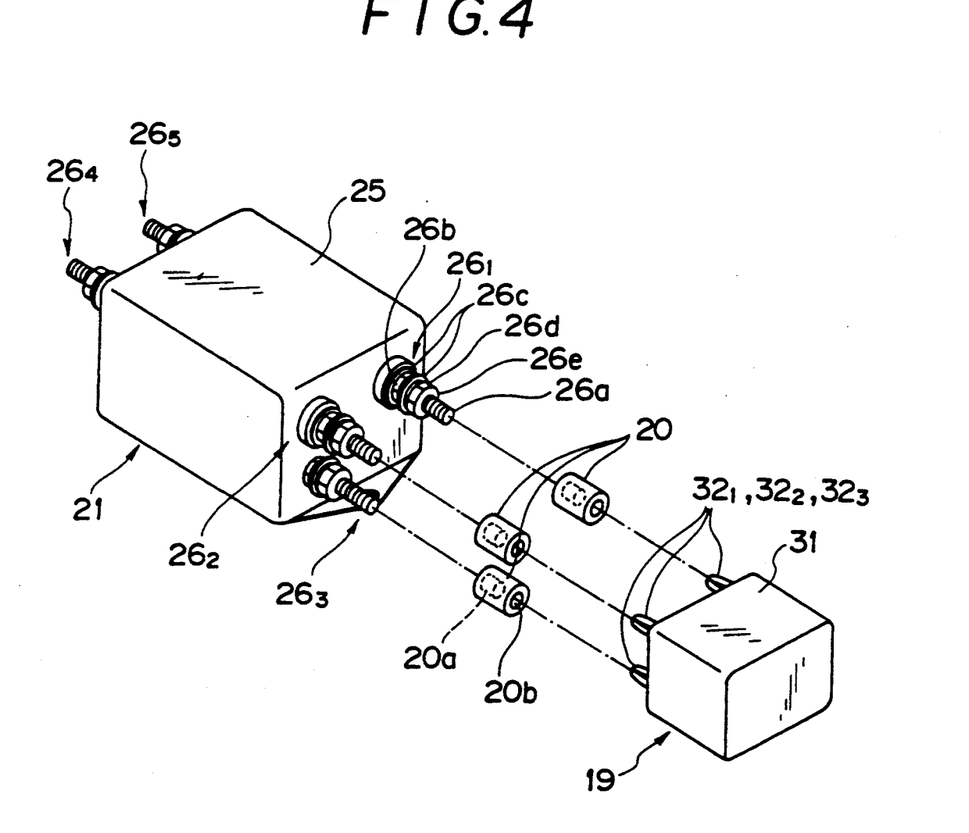
FIG. 4 is a perspective view of an embodiment of a surge absorber attached to a noise filter.

Referring now to FIG. 4, there is shown an existing noise filter 21 and an accessory surge absorber 19 that can be attached to noise filter 21. Noise filter 21 is housed in a chassis 25 from a rear wall of which a pair of lug screw external terminals $26_4$ and $26_5$ extend. Three lug screw external terminals $26_1$, $26_2$ and $26_3$ project forward from a front end of chassis 25.

Surge absorber 19 is housed in a case 31. Three banana-type terminals $32_1$, $32_2$ and $32_3$ extend from a wall of chassis 25 for connection to noise filter 21. This connection is accomplished through the use of three electrically conductive metallic connector means 20. A first end of connector means 20 has an internal screw thread 20a that is threadable onto external terminals $26_1$, $26_2$ and $26_3$. A second end of connecting means 20, is a cylindrical receptacle 20b that is adapted for receiving banana-type terminals $32_1$, $32_2$ and $32_3$.

To connect surge absorber 19 to noise filter 21, connecting means 20 are threaded on to external terminals $26_1$, $26_2$ and $26_3$. This adapts noise filter 21 to receive banana-type terminals $32_1$, $32_2$ and $32_3$ of surge absorber 19. Banana-type terminals $32_1$, $32_2$ and $32_3$, which are spaced to correspond to external terminals $26_1$, $26_2$ and $26_3$, are then inserted into inserted into these external terminals.

Each external terminal, $26_1$ through $26_5$, is secured to chassis 25 by a nut 26b. Two washers 26c, a spring washer 26d and a nut 26e are used to secure a connector lug of a power lead to a screw 26a of each external terminal $26_1$ through $26_5$. External terminal $26_3$ is a ground terminal.

Figures 5, 6:
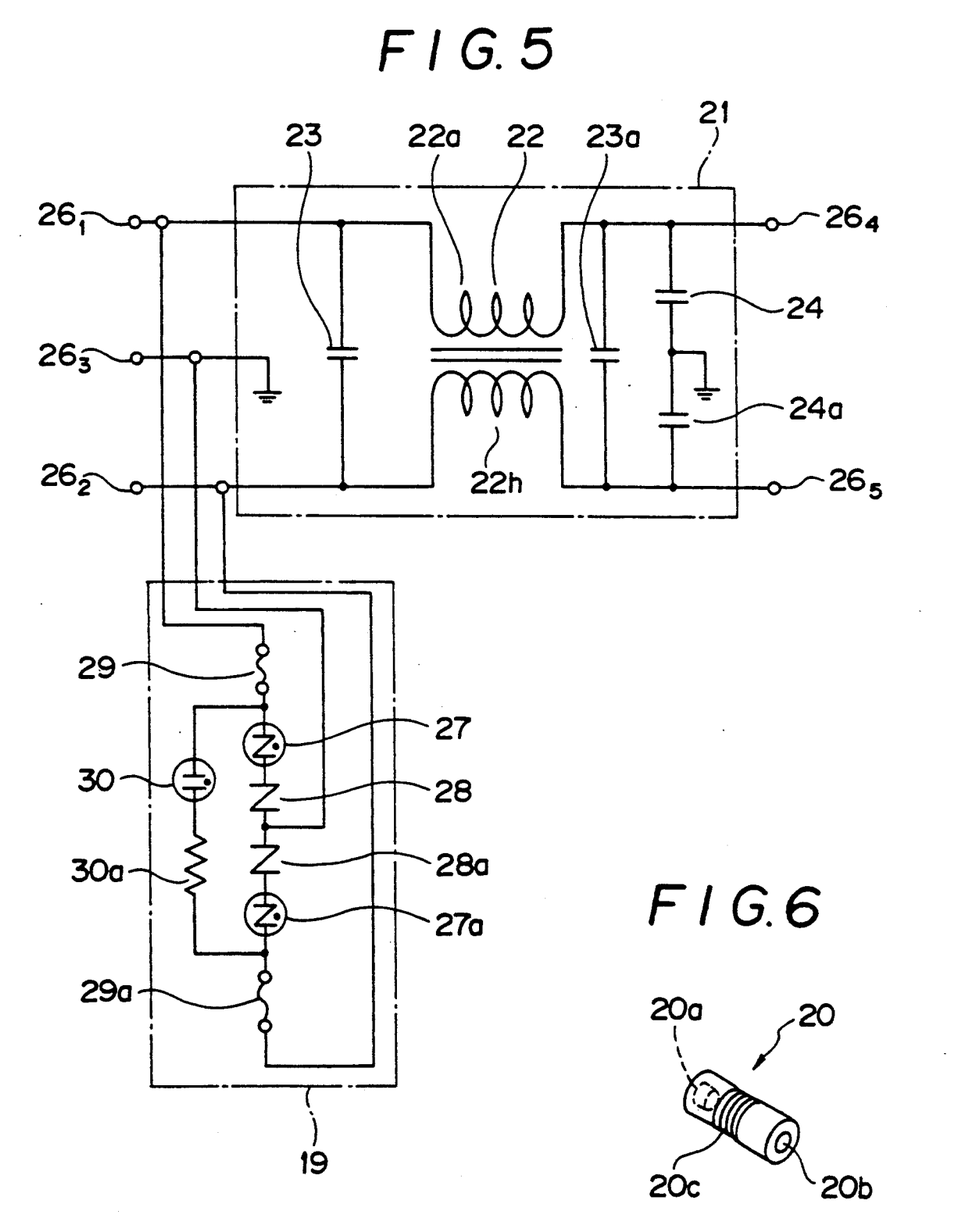
FIG. 5 is a circuit diagram of the device of FIG. 4.
FIG. 6 is a perspective diagram of a second connector means that can be used with the device of FIG. 4.

Referring now to FIG. 5, external terminal $26_1$ is connected to a junction of a first end of a capacitor 23, a first end of a winding 22a of a coil 22 and a first end of a fuse 29 of surge absorber 19. A second end of capacitor 23 is connected to a junction of external terminal $26_2$, a first end of winding 22h of coil 22 and a first end of a fuse 29a of surge absorber 19.

A first end of a capacitor 23a is connected to a junction of a second end of winding 22a of coil 22 a first end of a capacitor 24 and external terminal $26_4$. A second end of capacitor 23a is connected to a junction of a second end of winding 22h of coil 22, a first end of a capacitor 24a and external terminal $26_5$. Second ends of capacitors 24 and 24a are connected to ground.

A second end of fuse 29 of surge absorber 19 is connected to a junction of a first end of a surge absorbing element 27 and a first end of an indicator lamp 30. A second end of indicator lamp 30 is connected to a resistor 30a, whose second end is connected to a junction of a second end of fuse 29a and a first end of a surge absorbing element 27a. Second ends of surge absorbing elements 27 and 27a are connected to first ends of varistors 28 and 28a, respectively. Second ends of varistors 28 and 28a are connected to a junction of external terminal $26_3$ and ground.

The operation of surge absorber 19 and noise filter 21 are virtually identical to the operation of surge absorber 3 and noise filter 2 discussed with reference to FIG. 2.

Referring now to FIG. 6, there is shown a second embodiment of connecting means 20. A flexible central portion 20c made of coil spring is disposed between an internal screw thread 20a and a cylindrical receptacle 20b. Flexible central portion 20c allows the bending and deforming of connector means 20. This enables adding surge absorbers 19 to existing noise filters 21, even when banana-type terminals have a different pitch and, therefore, do not align perfectly with external terminals $26_1$, $26_2$ and $26_3$.

Because surge absorber 19 is removably attachable to an existing noise filter 21, surge absorber 19 can be removed and replaced, when required, for repair maintenance or testing without significant effort.

Figure 7:
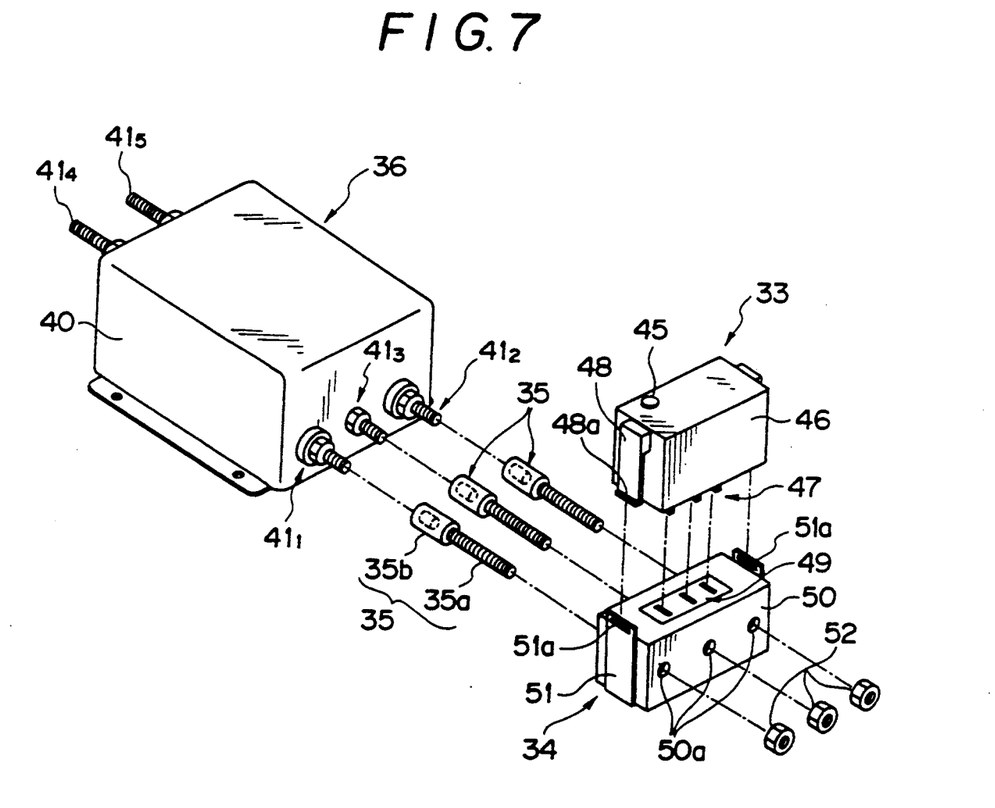
FIG. 7 is a perspective view of another embodiment of a surge absorber, attachable to a noise filter, attached to a noise filter.

Referring to FIG. 7, there is illustrated a second embodiment wherein a surge absorber 33 is to be added to an existing noise filter 36. Existing noise filter 36 is enclosed in a metal chassis 40. Two external screw terminals $41_4$ and $41_5$ extend from a rear wall (as shown in the figure) of chassis 40. Three external screw terminals $41_1$, $41_2$ and $41_3$ extend from a forward facing wall.

A connecting means 34 for mounting surge absorber 33 is housed in a case 50, through which are disposed three mounting holes 50a. A three terminal socket 49 is located on a top side of case 50 to accept a three pronged plug 47 of surge absorber 33, which is housed in a case 46 having an indicator lamp 45 mounted thereon.

Disposed on either side of case 46 is an attaching piece 48 with an extended convex tab 48a. When surge absorber 33 is mounted on connecting means 34, tabs 48a engage holes 51a of attaching means 51, disposed on sides of connecting means 34. This secures surge absorber 33 to connecting means 34. Electrical connection between surge absorber 33 and connecting means 34 is through three pronged plug 47 and three terminal socket 49.

Connecting means 34 is attached and electrically connected to noise filter 36 by three connecting means 35. Internally threaded cylindrical ends 35b of connecting means 35 are threaded onto screw terminals $41_1$, $41_2$, and $41_3$ of noise filter 36. Threaded shafts 35a of connecting means 35 are inserted through mounting holes 50a and secured by nuts 52 that are threaded on to a portion of threaded shafts 35a that extend through mounting holes 50a.

Figure 8:
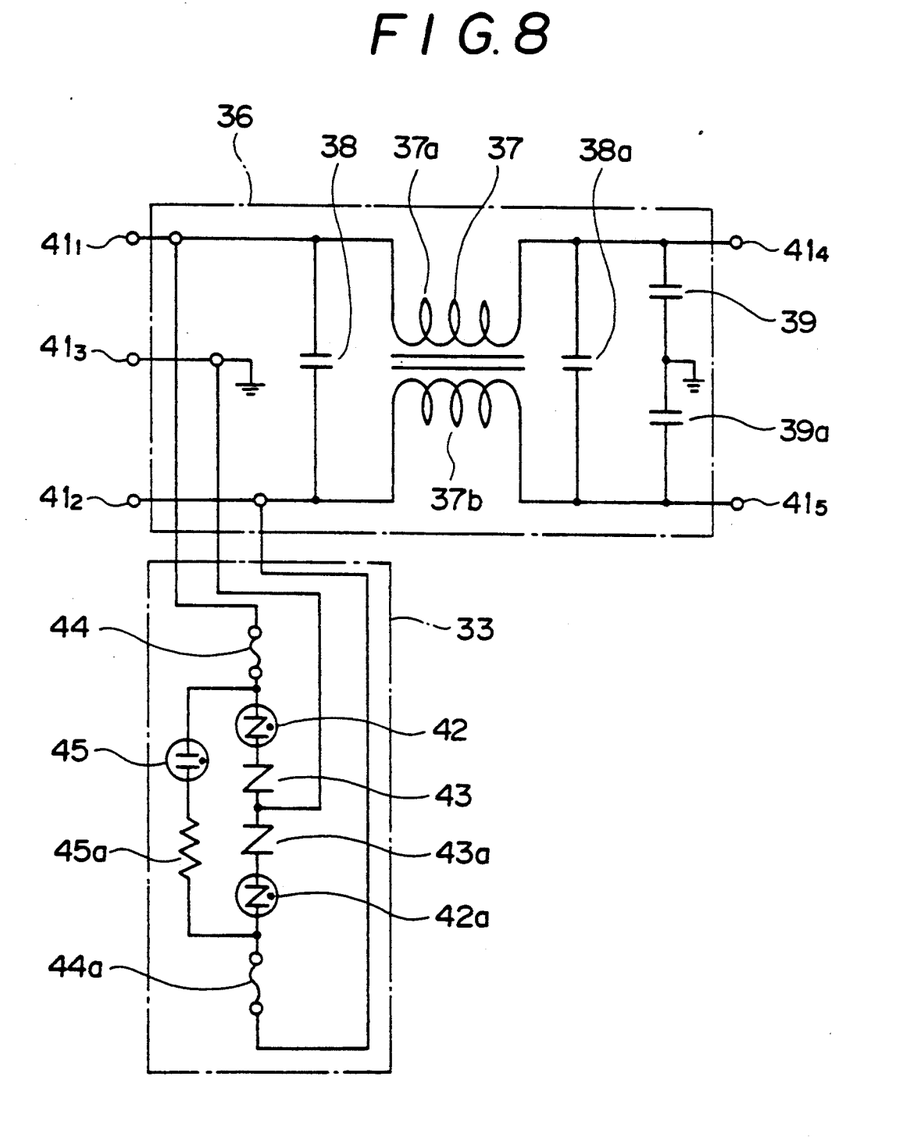
FIG. 8 is a circuit diagram illustrating the electrical connection between a surge absorber attachable to a noise filter and the noise filter of FIG. 7.

Referring now to FIG. 8, external terminal $41_1$ is connected to a junction of a first end of a capacitor 38, a first end of a winding 37a of a coil 37 and a first end of a fuse 44 of surge absorber 33. A second end of capacitor 38 is connected to a junction of external terminal $41_2$, a first end of a winding 37b of coil 37 and a first end of a fuse 44a of surge absorber 33.

A first end of a capacitor 38a is connected to a junction of a second end of winding 37a of coil 37 a first end of a capacitor 39 and external terminal $41_4$. A second end of capacitor 38a is connected to a junction of a second end of coil 37b of coil 37, a first end of a capacitor 39a and external terminal $41_5$. Second ends of capacitors 39 and 39a are connected to ground.

A second end of fuse 44 of surge absorber 33 is connected to a junction of a first end of a surge absorbing element 42 and a first end of indicator lamp 45. A second end of indicator lamp 45 is connected to a first end of a resistor 45a, whose second end is connected to a junction of a second end of fuse 44a and a first end of a surge absorbing element 42a. Second ends of surge absorbing elements 42 and 42a are connected to first ends of varistors 43 and 43a, respectively. Second ends of varistors 43 and 43a are connected to a junction of external terminal 41₃ and ground.

The operation of surge absorber 33 and noise filter 36 are virtually identical to the operation of surge absorber 33 and noise filter 36 are virtually identical to the operation of surge absorber 3 and noise filter 2 discussed with reference to FIG. 2 and therefore are not described.

Having described preferred embodiments of the present invention with reference to the accompanying drawings, it is to be understood that the invention is not limited to those precise embodiments, and that various changes and modifications may be affected therein by one skilled in the art without departing from the scope or spirit of the invention as defined in the appended claims.

What is claimed is:

1. An apparatus comprising:
   a noise filter;
   first, second and third threaded terminals extending from said noise filter;
   first, second and third connector means, each of said connector means having a first end including an internal screw thread threadable on a respective one of said threaded terminals and a second end having a threaded shaft;
   a connecting means;
   first, second and third mounting holes passing through said connecting means wherein each of said threaded shafts are alignable with and passable through a respective one of said mounting holes, and each are long enough to extend its end beyond said connecting means;
   a plurality of nuts threadable on said second ends and tightenable to secure said connecting means to said noise filter;
   a three terminal socket on said connecting means;
   a surge absorber;
   a three terminal plug on said surge absorber mateable with said three terminal socket; and
   removable means for mating and maintaining in a secure position said three terminal socket, whereby said surge absorber may be connected for use with a standard noise filter.

2. An apparatus comprising:
   a noise filter for filtering signals including input means with a plurality of screw type terminals, output means and filtering means, said filtering means located between said input means and said output means;
   a surge absorber;
   a plurality of mating elements each of which includes a through-hole;
   connecting means providing for the removable connection of said surge absorber connected to said input means in parallel with said filter means;
   said connecting means include mechanical connecting means, electrical connecting means and means for interfacing said surge absorber with said plurality of screw type terminals, wherein:
   said interfacing means include a plurality of threaded adapters for mating said plurality of mating elements to said surge absorber, wherein each of said plurality of threaded adapters includes a threaded connecting end threadable onto each of said plurality of screw type terminals having means on a second end including a threaded shaft alignable with and long enough to pass through and extend sufficiently beyond its respective through-hole to allow a nut thereon to be threaded onto a portion extended beyond its respective through-hole thereby providing at least part of said mechanical connecting means and said electrical connecting means.

3. An apparatus comprising:
   a noise filter having a plurality of screw type terminals;
   a surge absorber having a three terminal plug;
   connector means by which said plurality of screw type terminals may pass through and connect said noise filter to an attaching means, wherein said attaching means has a three terminal socket capable of connecting said attaching means to said three terminal plug of said surge absorber.

4. An apparatus comprising:
   a noise filter having a plurality of screw type terminals;
   a surge absorber having a plurality of banana terminals;
   a plurality of attaching means each having a screw portion for connecting to one of said plurality of screw type terminals at one end and a mounting hole for connecting with one of said plurality of banana terminals at its other end thereby forming an electrically conductive receptacle between said noise filter and said surge absorber.

* * * * *